Nov. 26, 1929.  J. W. WELSH  1,736,951
OPHTHALMIC MOUNTING
Original Filed June 13, 1923
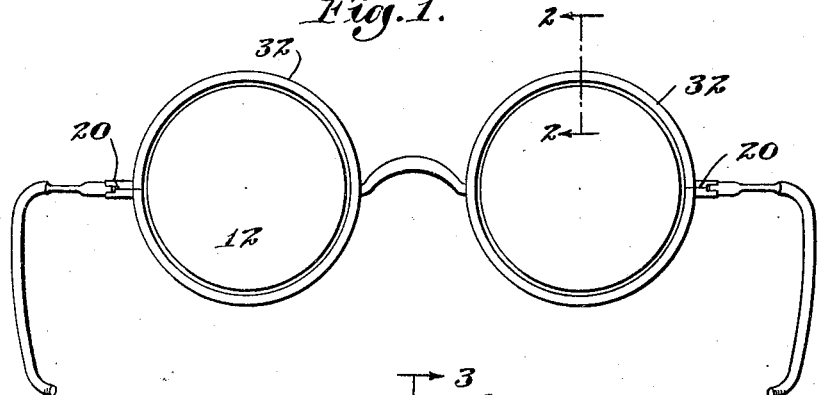
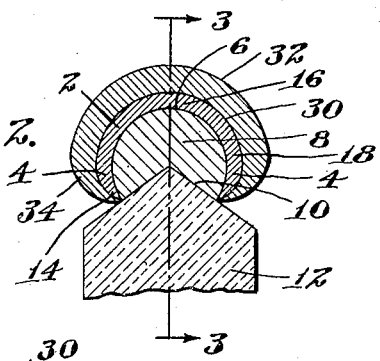
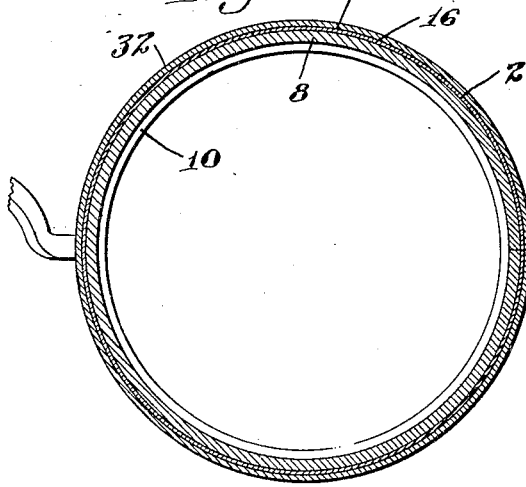
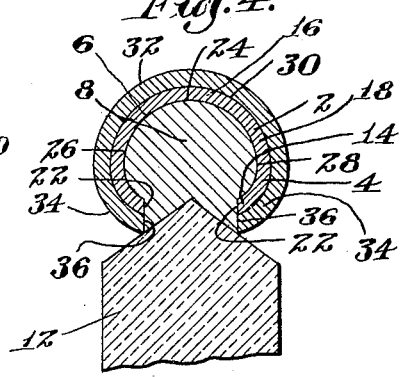
Inventor
James W. Welsh
by David Rines
Attorney Patented Nov. 26, 1929

1,736,951

UNITED STATES PATENT OFFICE

JAMES WILSON WELSH, OF PROVIDENCE, RHODE ISLAND, ASSIGNOR TO BAUSCH & LOMB OPTICAL COMPANY, OF ROCHESTER, NEW YORK, A CORPORATION OF NEW YORK

OPHTHALMIC MOUNTING

Original application filed June 13, 1923, Serial No. 645,118. Divided and this application filed January 4, 1926. Serial No. 79,139.

The present invention relates to ophthalmic mountings. The present application is a division of application Serial No. 645,118, filed June 13, 1923, now Patent No. 1,704,232, dated March 5, 1929.

One of the advantages claimed for ophthalmic mountings of the non-metal type is the cushioning effect produced upon the lenses when the mounting falls to the ground, thereby tending to prevent breakage. In some mountings of the combination-metal-and-non-metal type, the metal rim is seated in a slot of the non-metal rim, the advantages of the non-metal material being thereby combined with the rigidity and other characteristics of the metal.

An object of the present invention is to provide such cushioning effect in mountings of the combined-metal-and-non-metal type of the above-described character.

To this end, a feature of the invention resides in providing the metal rim with an inner slot within which is hidden a non-metal rim that contacts with the lens. The same cushioning effect is thus obtained as in non-metal mountings. The combined-metal-and-non-metal rim is then seated in a slot of an outer non-metal rim. A combination-metal-and-not-metal rim is thus produced the metal rim of which is seated within an inner slot of the non-metal rim, and in which the lens is nevertheless cushioned by seating against non-metal material. The intermediately positioned metal rim imparts rigidity to the structure, the inner non-metal rim cushions the lens, and the outer non-metal rim gives to the mounting the non-metal appearance desired by the wearer.

Other and further objects will appear hereinafter.

With the above objects in view, the invention consists of the improved ophthalmic mounting hereinafter described, illustrated in the accompanying drawings and defined in the appended claims.

In the accompanying drawings, Fig. 1 is an elevation of a pair of spectacles constructed according to the present invention; Fig. 2 is a section taken upon the line 2—2 of Fig. 1; Fig. 3 is a section taken upon the line 3—3 of Fig. 2; and Fig. 4 is a section similar to Fig. 2 of a modification.

According to the preferred form of the present invention, spectacles, eyeglasses and the like are provided with metal rims 2 having annular wings 4 forming between them an inner annular slot 6. An inner non-metal rim 8 is seated in the slot 6 so as to be enclosed between the wings 4, becoming thus hidden from view. The non-metal rim 8 is provided with a groove 10 adapted to receive a lens 12. The lens is thus cushioned by the non-metal material.

In order that the non-metal rim may be held in place in the metal rim, it is preferred to have the annular slot 6 narrower at a position 14 comparatively far from the body 16 of the rim than at a position 18 comparatively near to the body of the rim. In the illustrated embodiments of the invention, the narrowest portions are at the mouth of the slot, but this is not essential. The walls of the slot near the mouth, or near the narrower portions of the slot wherever situated, engage the non-metal rim, and the rims are thus held against separation. As the non-metal material, which may be zylonite or any other substance, is usually resilient, the non-metal rim may be readily sprung into the slot 6. The non-metal rim may, however, be mounted in the slot 6 in other ways, as by sliding one rim into the slot of the other. Such sliding is easily rendered possible when the rims are split, as shown at 20. The non-metal rim may, however, be simply seated in the slot of the metal rim. The rims may be locked against separation in many ways, as by having the slot 6 trapezoidal in cross section as illustrated in the above-described application; or by having the slot substantially circular in cross section, as shown in Fig. 2, or by having the annular slot bounded by substantially parallel lines 22 that are joined together by a curve 24 that is of greater width between the points 26 and 28 than the distance between the parallel lines, as shown in Fig. 4. These views are suggestive, but not exclusive, as other shapes will readily occur to persons skilled in the art.

According to the present invention, the combined-metal-and-non-metal rim heretofore described is seated within a slot 30 of an outer non-metal rim 32, as illustrated in Figs. 3 and 4. Here, again, the wings 34 of the non-metal rim may be so shaped, and the cross-sectional conformation of the slot 30 so designed, as to enclose and hold enclosed both the metal rim 2 and the non-metal rim 8.

If desired, the non-metal rims 8 and 32 may be caused to come into contact, as illustrated at 36, Fig. 4, and a cement applied to unite the contacting parts together. The rims 8 and 32 would thus become integrally united into a single whole, with a metal reinforcing rim 2 enclosed between them.

Other applications of this invention will occur to persons skilled in the art, and are considered to fall within the spirit and scope of the present invention. It is therefore desired that the appended claims be broadly construed, unlimited except in so far as limitations may be imposed by the prior art.

What is claimed is:

1. An ophthalmic mounting having, in combination, a metal rim having annular wings forming between them an annular slot that is narrower at a position comparatively far from the body of the rim than at a position comparatively near to the body of the rim, a non-metal rim seated in the slot, the walls of the slot near the narrower portions engaging the non-metal rim to hold the rims against separation, one of the rims having a lens-receiving groove, and a non-metal rim in which the metal rim is mounted.

2. An ophthalmic mounting having, in combination, a metal rim having annular wings forming between them an inner annular slot that is narrower at a position comparatively far from the body of the rim than at a position comparatively near to the body of the rim, a non-metal rim seated in the slot and enclosed between the wings, the walls of the slot near the narrower portions engaging the non-metal rim to hold the rims against separation, and the non-metal rim having a lens-receiving groove, and a non-metal rim in which the metal rim is mounted.

3. An ophthalmic mounting having, in combination, a rim having an annular slot, a rim seated in the slot having an annular slot, and a rim seated in the slot of the second-named rim, one of the rims having a lens-receiving groove.

4. An ophthalmic mounting having, in combination, a rim having annular wings forming between them an annular slot, a rim seated in the slot and enclosed between the wings, the second-named rim having an annular slot, and a rim seated in the slot of the second named rim, one of the rims having a lens-receiving groove.

5. An ophthalmic mounting having, in combination, an outer non-metal rim having annular wings forming between them an inner annular slot, an intermediately positioned metal rim seated in the slot and enclosed between the wings, the metal rim having an annular slot, and an inner non-metal rim seated in the slot of the metal rim and having a lens-receiving groove.

6. An ophthalmic mounting having, in combination, an outer non-metal rim having annular wings forming between them an inner annular slot that is narrower at a position comparatively far from the body of the rim than at a position comparatively near to the body of the rim, an intermediately positioned metal rim seated in the slot and enclosed between the wings, the walls of the slot near the narrower portions engaging the non-metal rim to hold the rims against separation, the metal rim having an annular slot, and an inner non-metal rim seated in the slot of the metal rim and having a lens-receiving groove.

7. An ophthalmic mounting as defined in claim 6 in which the slot in the metal rim is formed by annular wings that enclose between them the inner non-metal rim.

8. An ophthalmic mounting as defined in claim 6 in which the non-metal rims are integrally connected together.

9. An ophthalmic mounting having, in combination, a plurality of rims respectively of metal and non-metal material, one enclosed within another, two of the said rims having adjacently disposed parts that are integrally connected together, the said two rims being of non-metal material.

10. An ophthalmic mounting as defined in claim 2 in which the annular slot of the metal rim is substantially circular in cross section.

11. An ophthalmic mounting as defined in claim 2 in which the annular slot of the metal rim is bounded in cross section by substantially parallel lines that are joined together by a curve of greater width than the distance between the parallel lines.

12. An ophthalmic mounting having, in combination, an outer metal rim having an inner slot, an inner non-metal rim hidden in the slot, the non-metal rim having a lens-receiving groove, and a non-metal rim in which the metal rim is mounted.

In testimony whereof, I have hereunto subscribed my name.

JAMES W. WELSH.